United States Patent
Jou et al.

(10) Patent No.: US 8,329,083 B2
(45) Date of Patent: Dec. 11, 2012

(54) METHOD OF MAKING A LASTED SKATE BOOT

(75) Inventors: Wern-Shiarng Jou, Kaohsiung (TW); Ming-Shou Chien, Yangmei Township (TW); Tai-Heng Chen, Taipei (TW); Gaetan Champagne, Saint-Colomban (CA)

(73) Assignee: Bauer Hockey, Inc., Exeter, NH (US)

( * ) Notice: Subject to any disclaimer, the term of this patent is extended or adjusted under 35 U.S.C. 154(b) by 0 days.

(21) Appl. No.: 12/834,760

(22) Filed: Jul. 12, 2010

(65) Prior Publication Data

US 2010/0275393 A1 Nov. 4, 2010

Related U.S. Application Data

(62) Division of application No. 11/655,131, filed on Jan. 19, 2007, now abandoned.

(51) Int. Cl.
  *B29C 45/14* (2006.01)
(52) U.S. Cl. ........................................ 264/257
(58) Field of Classification Search .............. 264/257
  See application file for complete search history.

(56) References Cited

U.S. PATENT DOCUMENTS

| | | | |
|---|---|---|---|
| 3,807,062 A | 4/1974 | Spier |
| 4,509,276 A | 4/1985 | Bourque |
| 4,651,444 A | 3/1987 | Ours |
| 4,777,741 A | 10/1988 | James |
| 5,339,544 A | 8/1994 | Caberlotto |
| 6,499,233 B1 | 12/2002 | Chenevert |
| 6,558,784 B1 | 5/2003 | Norton et al. |
| 6,871,424 B2 | 3/2005 | Labonte et al. |
| 7,140,127 B2 | 11/2006 | Yang |
| 7,219,900 B2 | 5/2007 | Meibock |
| 7,533,479 B2 | 5/2009 | LaBonte |

FOREIGN PATENT DOCUMENTS

| | | |
|---|---|---|
| EP | 1 384 568 | 1/2004 |
| EP | 1 582 107 | 10/2005 |
| FR | 2 298 288 | 8/1976 |

*Primary Examiner* — Larry Thrower

(57) ABSTRACT

A method of making a lasted skate boot comprising: (a) providing a male-female mold having male and female sections for defining a mold cavity therebetween, the male section having sides, a rear portion and a bottom portion for defining a three dimensional shape corresponding to the external three dimensional shape of the foot, the female section defining a recess for receiving the male section, the male section comprising a plurality of inner channels for admitting liquid plastic material in the mold cavity; (b) providing a pre-cut sheet made of cloth material laminated to a support made of non-woven fabric; (c) placing the sheet on the male section of the mold such that the non-woven fabric contacts the sides and rear portion of the male section of the mold; (d) closing the male and female sections of the mold; (e) injecting liquid plastic material in the inner channels such that the liquid plastic material spreads on the sheet, pushes the sheet against the recess of the female section of the mold, fills the mold cavity and fuses with the non-woven fabric to form, after cooling, an outer shell comprising a heel portion for surrounding the heel, an ankle portion for surrounding the ankle, and medial and lateral side portions for enclosing the medial and lateral sides of the foot respectively; (f) opening the male and female sections of the mold; and (g) removing the outer shell from the mold.

13 Claims, 8 Drawing Sheets

METHOD OF MAKING A LASTED SKATE BOOT

This application is a divisional application of U.S. patent application Ser. No. 11/655,131 filed on Jan. 19, 2007, the contents of which are hereby incorporated in their entirety by reference.

FIELD OF THE INVENTION

The present invention relates to a method of making a lasted skate boot.

BACKGROUND OF THE INVENTION

The construction of sporting boots used for sporting activities such as ice skating, roller skating, hiking, trekking and cross-country skiing has become quite complex over recent years. Existing sporting boots often include multiple different components, and multiple different materials in order to provide the sporting boot with the performance and aesthetic requirements imposed by consumers. As such, over recent years different manufacturing processes have been developed and new materials have been used.

U.S. Pat. No. 3,807,062 discloses a boot having an inner layer formed of a rigid material for providing rigidity at selected locations such as the sole, heel and ankle portion of the foot; and an outer layer, which is molded over the inner layer. The boot is thus reinforced at selected area while other areas are more flexible.

U.S. Pat. No. 4,509,276 discloses a skate boot made of a lower exterior molded rigid plastic portion and intermediate and upper portions made of pliable material to allow forward flexure and torsional flexibility in the ankle area.

U.S. Pat. No. 4,777,741 discloses an article of footwear such as a shoe or skate, which comprises a molded outer shell and a semi-rigid molded tongue portion to close the footwear.

U.S. Pat. No. 5,339,544 discloses a footwear comprising a first component made of a single piece of molded synthetic material having a rear upper portion which extend from an insole, and a second component made of soft material having a front upper portion and a lining. The two components are connected together with the lining of the second component inserted inside the rear portion of the first component.

U.S. Pat. No. 6,499,233 discloses a footwear comprising a structural molded inner shell for supporting and enclosing the foot and an outer skin bonded onto the outer sides of the inner shell.

These designs effectively reduce the number of components utilized in the construction of footwear or skate. However, the appearance of some of these designs is not always appealing.

Thus there is a need in the industry for a skate boot having fewer components, providing good foot support and has an exterior look which may be made more appealing to the consumer.

SUMMARY OF THE INVENTION

As embodied and broadly described therein, the present invention provides a method of making a lasted skate boot for enclosing a human foot when in use, the foot having a heel, an ankle with a medial malleolus and a lateral malleolus, a plantar surface, medial and lateral sides and toes, said method comprising: (a) providing a male-female mold having male and female sections for defining a mold cavity therebetween, the male section having sides, a rear portion and a bottom portion for defining a three dimensional shape corresponding to the external three dimensional shape of the foot, the female section defining a recess for receiving the male section, the male section comprising a plurality of inner channels for admitting liquid plastic material in the mold cavity; (b) providing a pre-cut sheet made of a cloth laminated to a support made of non-woven fabric; (c) placing the sheet on the male section of the mold such that the non-woven fabric contacts the sides and rear portion of the male section of the mold; (d) closing the male and female sections of the mold; (e) injecting liquid plastic material in the inner channels at a temperature of between 160° C. and 200° C. and at a pressure of between 985 psi and 1015 psi such that the liquid plastic material spreads on the sheet, pushes the sheet against the recess of the female section of the mold, fills the mold cavity and fuses with the non-woven fabric to form, after cooling, an outer shell comprising a heel portion for surrounding the heel, an ankle portion for surrounding the ankle, and medial and lateral side portions for enclosing the medial and lateral sides of the foot respectively; (f) opening the male and female sections of the mold; and (g) removing the outer shell from the mold.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of examples of embodiments of the present invention is provided hereinbelow with reference to the following drawings, in which.

Figure 1:
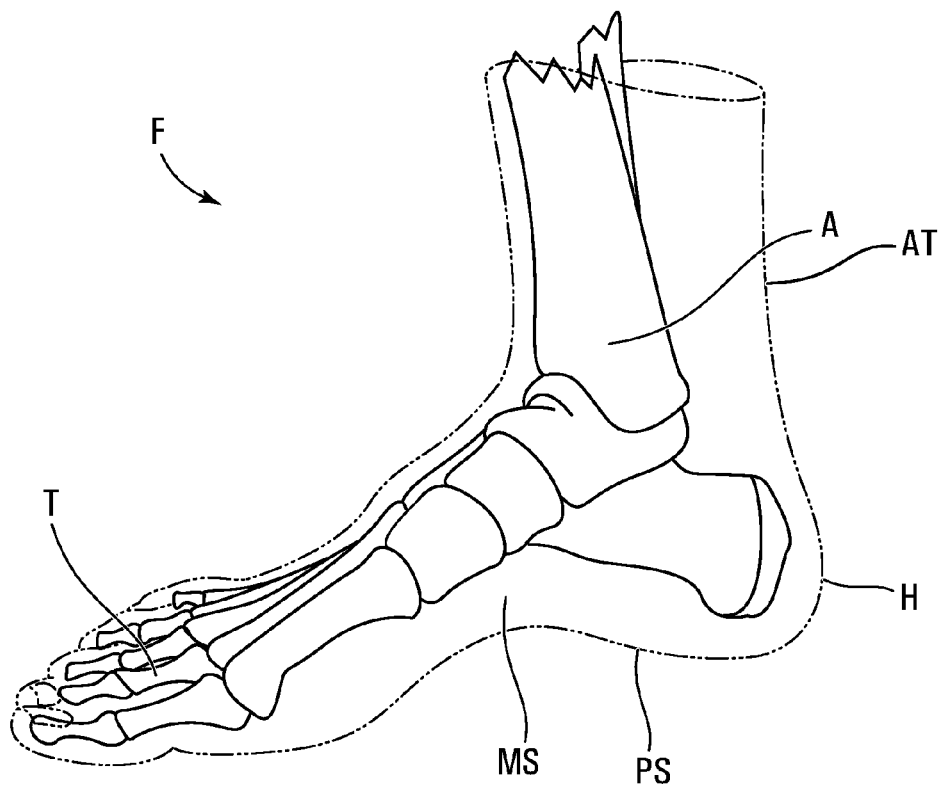
FIG. 1 is a side view of a human foot with the integument of the foot shown in stippled lines and the bones shown in solid lines.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION OF THE EMBODIMENTS

To facilitate the description, any reference numerals designating an element in one figure will designate the same element if used in any other figures. In describing the embodiments, specific terminology is resorted to for the sake of clarity but the invention is not intended to be limited to the specific terms so selected, and it is understood that each specific term comprises all equivalents.

Figure 2:
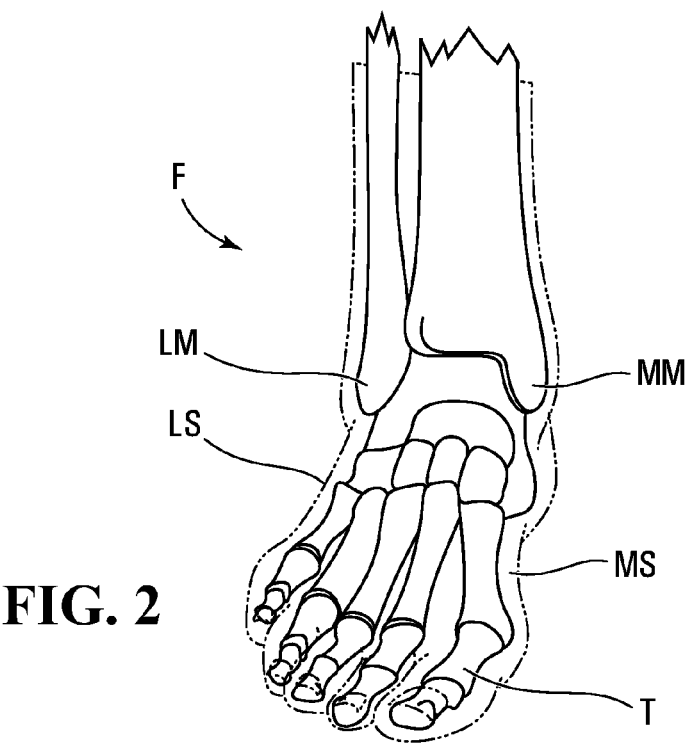
FIG. 2 is a front view of the human foot of FIG. 1.

Shown in FIGS. 1 and 2 is a typical human foot F that includes toes T, a plantar surface PS, a medial side MS and a lateral side LS. In addition, the human foot includes a heel H, an Achilles tendon AT and an ankle A having a lateral malleolus LM and a medial malleolus MM, the lateral malleolus LM being at a lower position than the medial malleolus MM.

Figure 3:
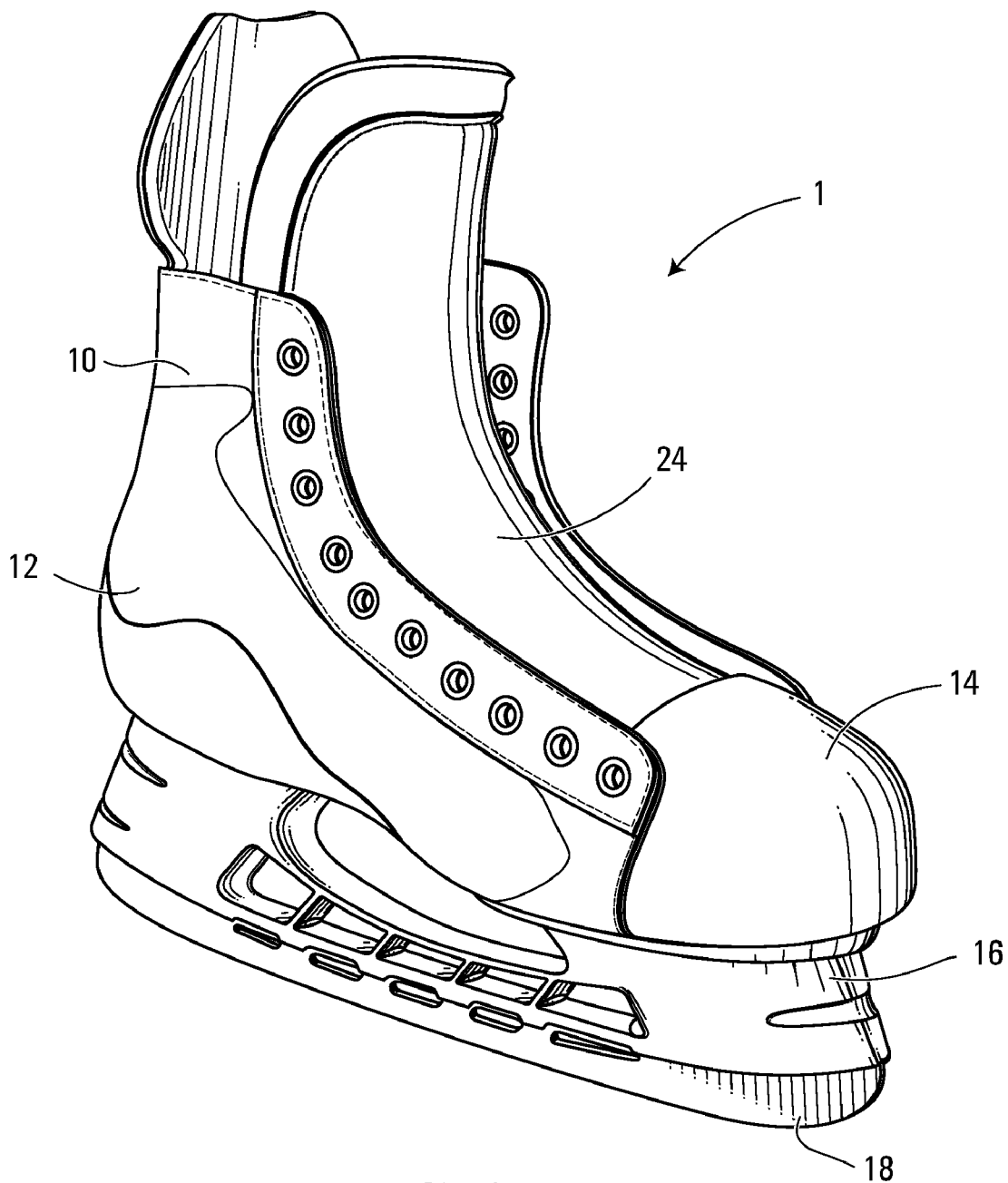
FIG. 3 is a perspective view of an ice skate comprising an outer shell in accordance with a the present invention.
Figure 4:
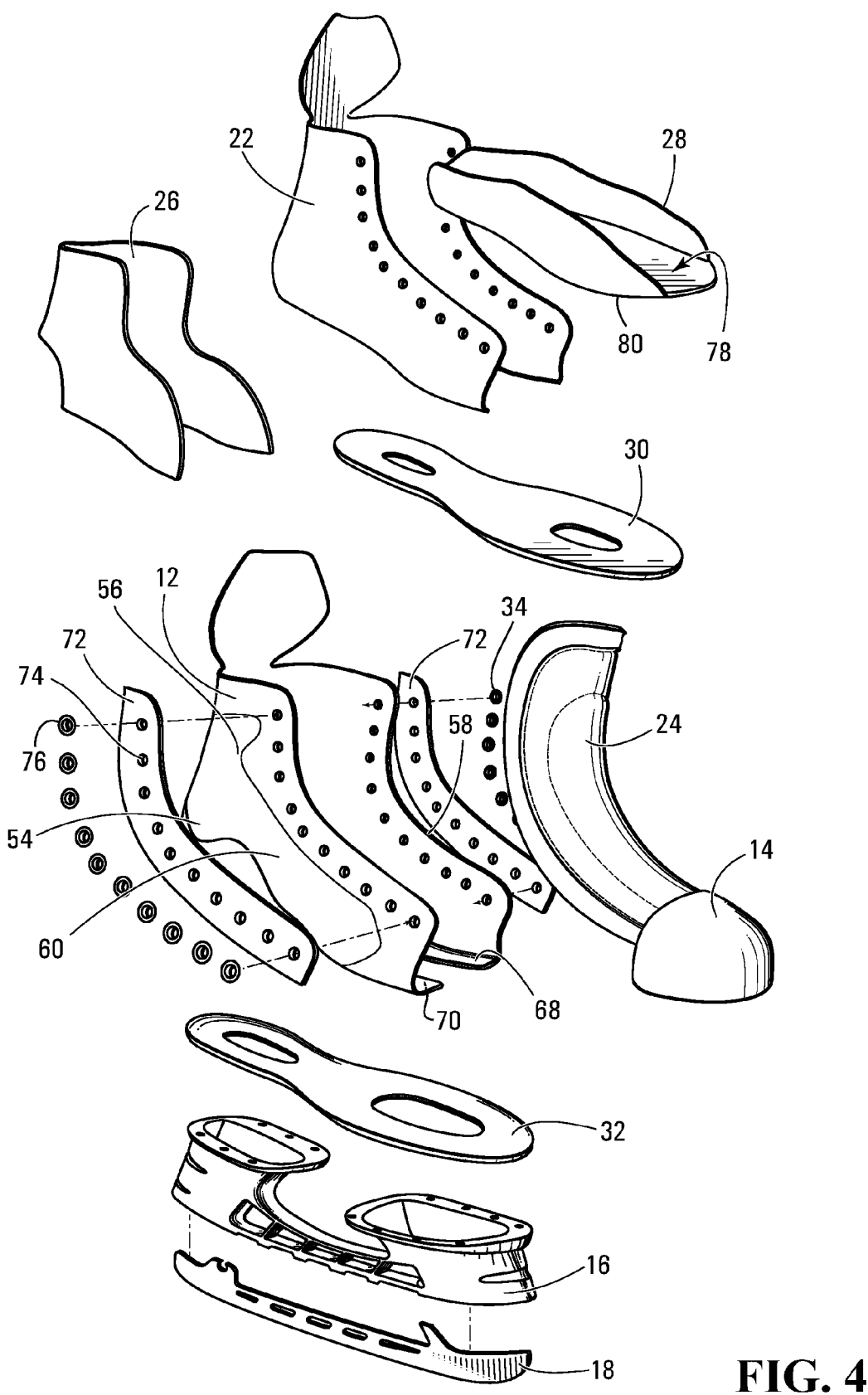
FIG. 4 is an exploded view of the ice skate of FIG. 3

Shown in FIGS. 3 and 4 is an ice skate 1 that comprises a skate boot 10 suitable for enclosing a right human foot F. The ice skate 1 has an outer shell 12, a toe cap 14, a tongue 24, a padding element 26 (optional component), an inner lining 22, a footbed 28, an insole 30, an outsole 32, an ice skate blade holder 16 and a blade 18.

The method of making the outer shell 12 will now be described in more detail below with respect to FIGS. 5 to 9. FIGS. 5 to 8 show a mold 34 for making the outer shell 12. The mold 34 is a male-female mold having a male section 36 and a female section 38 for defining a mold cavity therebetween.

Figure 5:
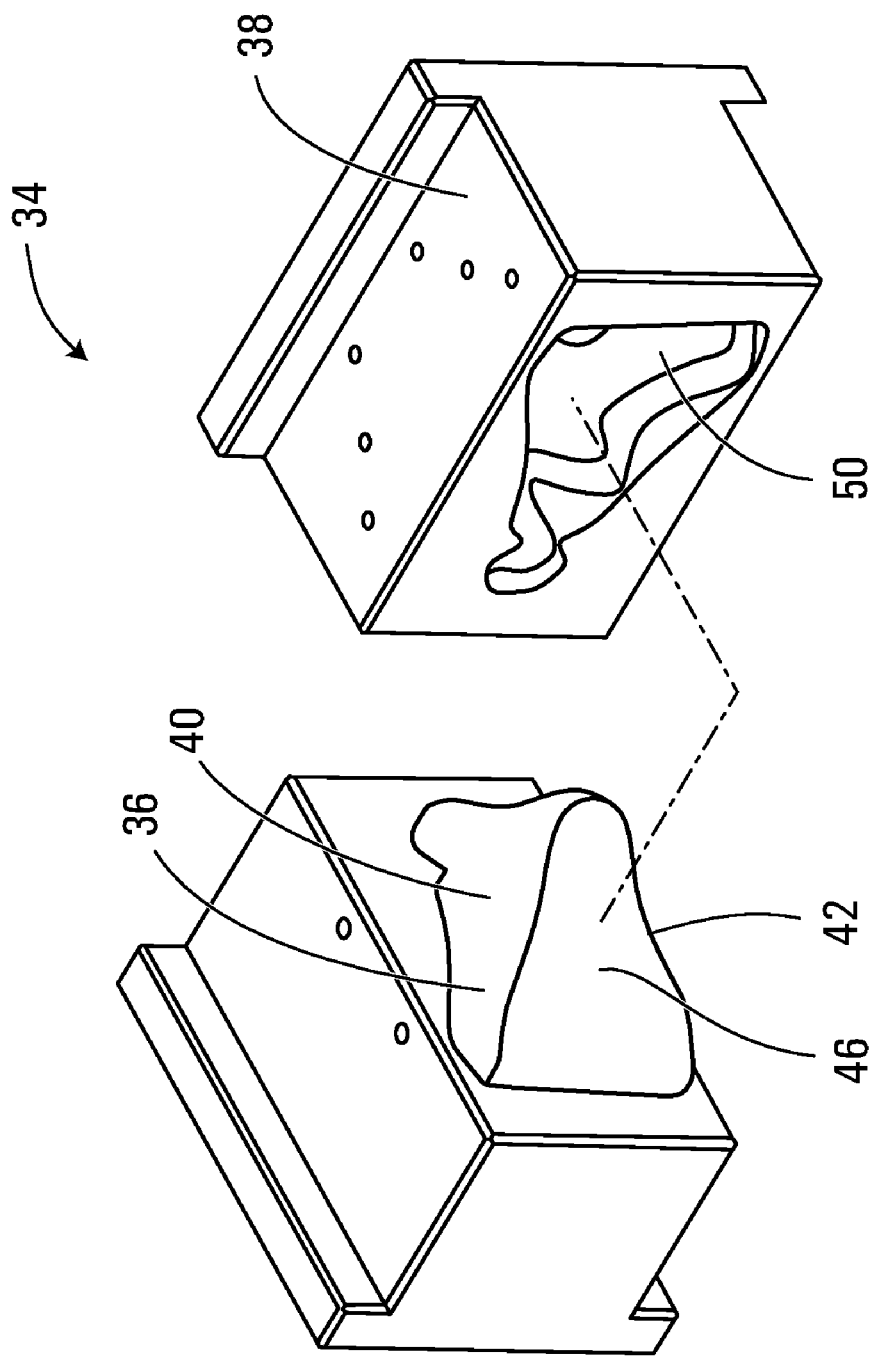
FIG. 5 is a perspective view of male and female sections of a mold for making the outer shell.
Figure 6:
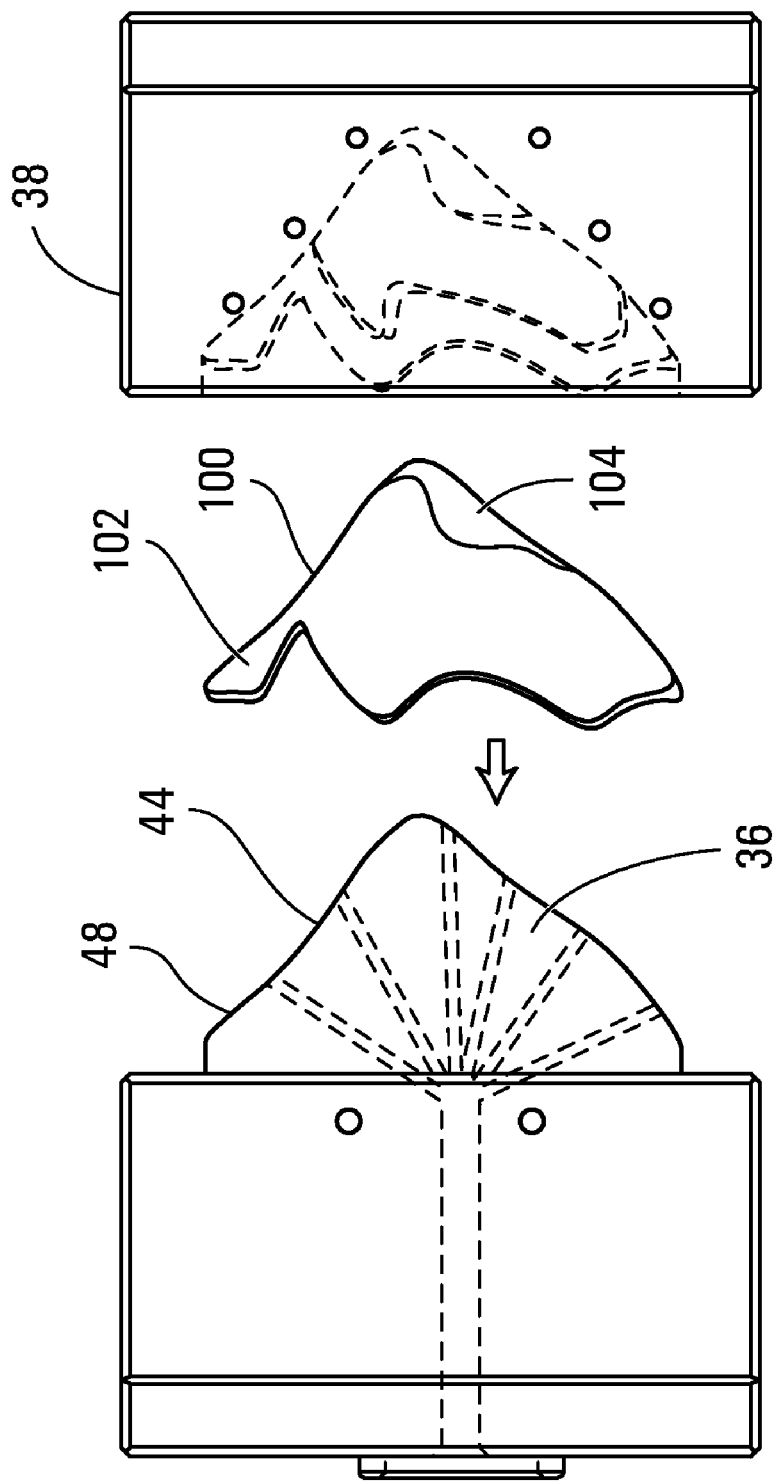
FIG. 6 is side view of the male and female sections of the mold of FIG. 5, where the sheet used for making the outer shell is shown.
Figure 7:
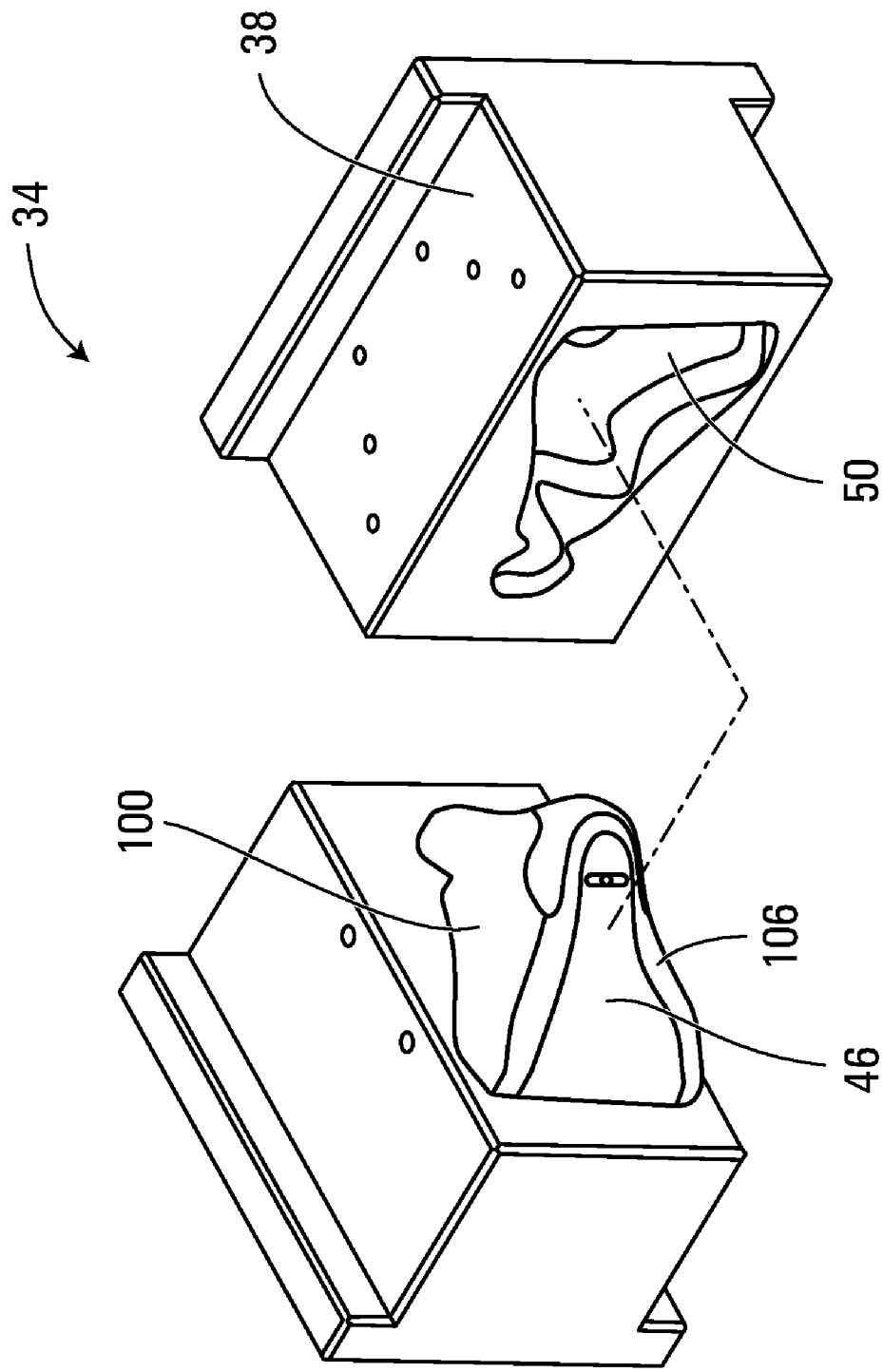
FIG. 7 is side view of the male and female sections of the mold of FIG. 5 with the sheet placed over the male section of the mold.
Figure 8:
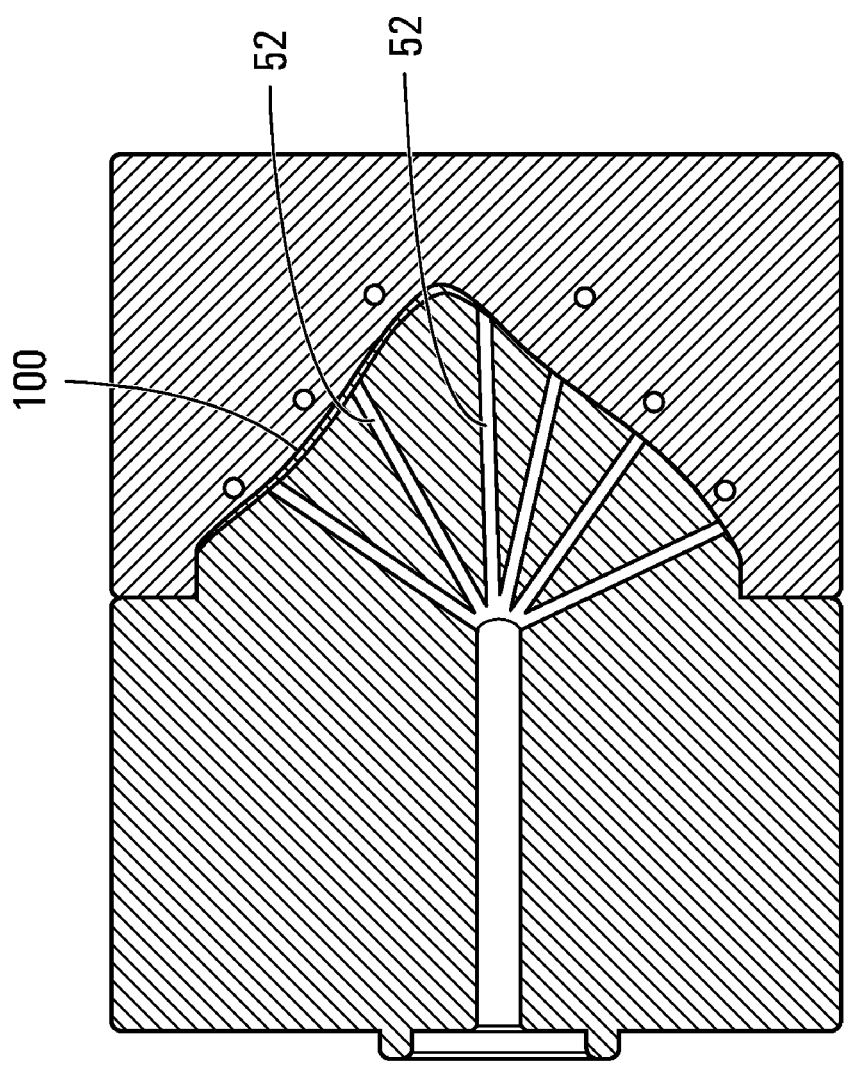
FIG. 8 is a cross-sectional view of the male and female sections, once closed and with the sheet in the mold cavity.

As best seen in FIGS. 5 to 7, the male section 36 has medial and lateral sides 40, 42, a rear portion 44 and a bottom portion 46 for defining a three dimensional shape corresponding to the external three dimensional shape of the foot F. The rear portion 44 may further comprise an upper portion 48 corresponding to the shape of the Achilles tendon AT. The female section 38 has a recess 50 for receiving the male section 36. As seen in FIG. 7, the male section 36 comprises a plurality of inner channels 52 for admitting liquid plastic material in the mold cavity.

In order to make the outer shell 12, a pre-cut sheet 100 made of cloth material (e.g. polyester, nylon, carbon fibers, synthetic fibers or fiberglass) laminated to a support made of non-woven fabric. As it is well known in the art, non-woven fabric is manufactured by putting small fibers together in the form of a sheet and then binding them either with an adhesive or by interlocking them with serrated needles such that the inter-fiber friction results in a strong fabric. The sheet 100 is after placed on the male section 36 of the mold such that the non-woven fabric contacts the sides and rear portions 40, 42, 44 of the male section 36 of the mold.

The male and female sections 36, 38 of the mold are then closed and liquid plastic material is injected in the inner channels 52 at a temperature of between 160° C. and 200° C. and at a pressure of between 985 psi and 1015 psi such that the liquid plastic material spreads on the sheet, pushes the sheet 100 against the recess 50 of the female section of the mold, fills the mold cavity and fuses with the non-woven fabric to form the outer shell 12. It is understood that non-woven fabric has to be of a certain thickness depending on the type of cloth used in order to create a barrier to prevent the plastic from going through the cloth during the injection process, while the plastic is in its liquid form. For example, for a cloth made of polyester TH3076/600D SILVER, a non-woven fabric having a thickness of 0.8 mm is used. There is a number of plastic materials that are suitable and can be used such as but not limited to: surlyn, ethylene vinyl acetate (EVA), thermoplastic polyurethane (TPU), nylon66, hytrel, polypropylene, polyethylene.

After cooling the male and female sections 36, 38 of the mold are opened and the outer shell 12 is finally removed from the mold. The excess material around the perimeter of the outer shell 12 may be trimmed after.

It is understood that the plastic material enters in a liquid form in the mold, fuses with the non-woven material, and after about 10 seconds, the plastic is in a solid form such that the outer shell is made and the mold is open. The cycle time of the injection may be between 60 seconds and 90 seconds. For example, it may take about 20 seconds to put the sheet in the mold, about 45 seconds to close the mold and inject the liquid plastic, about 10 seconds for cooling, and about 15 seconds to open the mold and remove the outer shell.

Figure 9:
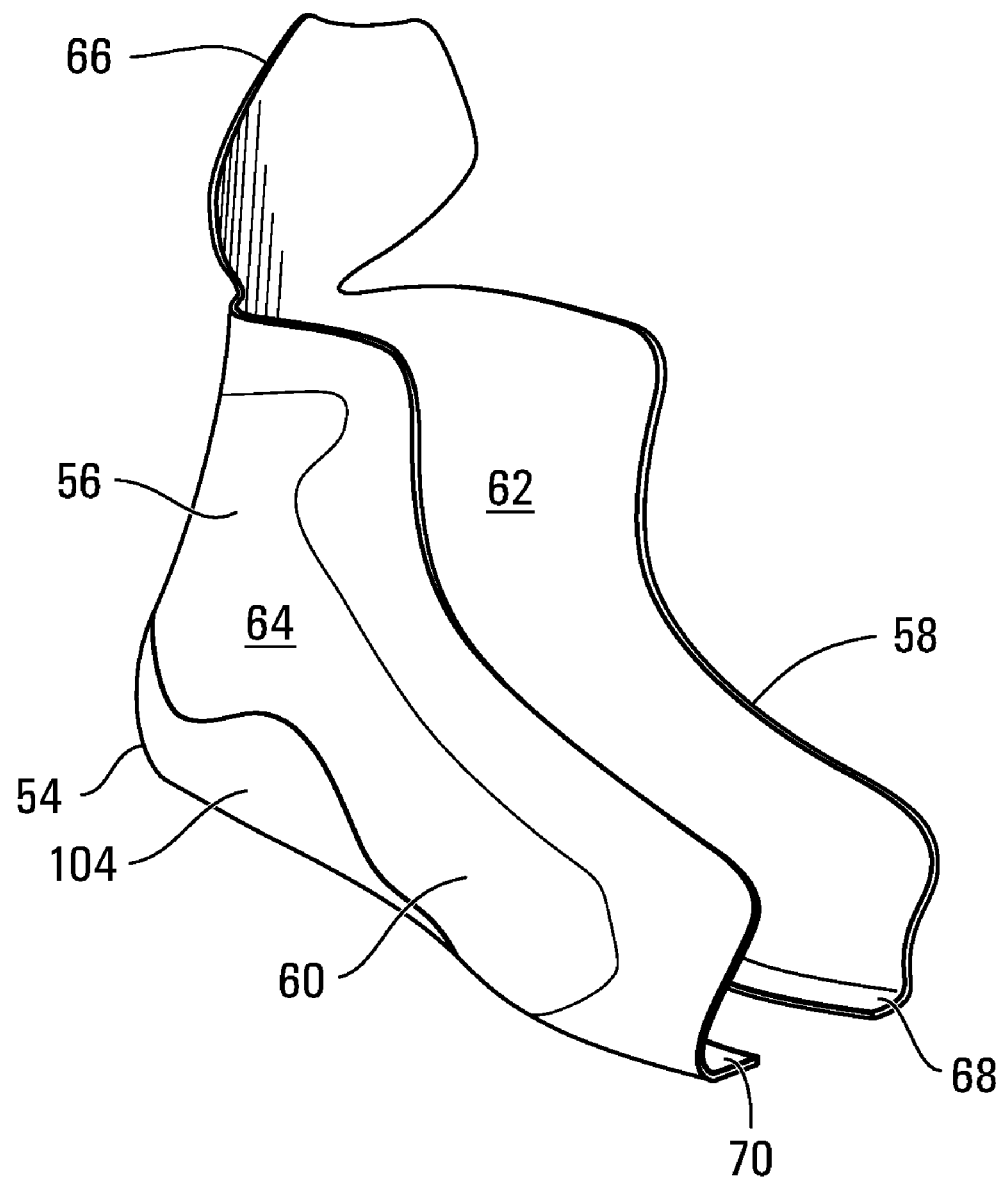
FIG. 9 is a perspective view of the outer shell.

As shown in FIG. 9, the outer shell 12 comprises a heel portion 54 for receiving the heel H, an ankle portion 56 for receiving the ankle A and medial and lateral side portions 58, 60 for facing the medial and lateral sides MS, LS respectively. These portions 54, 56, 58, 60 form a foot receiving cavity that conforms to the general shape of the foot F. The medial and lateral side portions 58, 60 extend forwardly from the heel portion 54. The heel portion 54 may be substantially cup shaped for following the contour of the heel H. The outer shell 12 has an inner surface 62 facing the foot F when in use, and an outer surface 64. The inner surface 62 is made of plastic fused with the non-woven fabric previously laminated with the cloth material and the outer shell 12 offers a good resistance to wear, abrasion, cuts, impacts and moisture.

The outer shell 12 may also comprise a tendon guard portion 66 for covering the Achilles tendon AT. As seen in FIG. 6, the sheet 100 has then a portion 102 extending over the upper portion 48 of the male section 36 of the mold. It is understood that the portion 102 may be integrally formed with the sheet 100 (as shown in FIG. 6) or can be a separate sheet stitched to the sheet 100. The separate sheet may be made of a different material than that of the outer shell 12.

In some cases, a foxing portion 104 made of flexible TPU or PVC material may be affixed to the sheet 100 prior to placing the sheet 100 in the mold.

The ankle portion 56 may comprise a medial cup-shaped depression for receiving the medial malleolus MM and a lateral cup-shaped depression for receiving the lateral malleolus LM, the lateral depression being located slightly lower than the medial depression, for conforming to the morphology of the foot F.

The medial and lateral side portions 58, 60 of the outer shell 12 may comprise respective medial and lateral skirts 68, 70 that are integrally formed therewith and extend downwardly therefrom. It is understood that the sheet 100 has then a portion 106 extending over the bottom portion 46 of the male section 36 of the mold.

Once the outer shell 12 has been obtained after the injection process, the inner lining 22 may then be glued or sewed to the inner surface 62 of outer shell 12. The inner lining 22 is made of a layer of soft material such as a sheet of polyester fabric or synthetic leather or fabric made from 100% nylon fibers, which are laminated with a 1.5 to 2 mm layer of foam. The inner lining 22 comprises an inner surface that is adapted to contact the skin of the foot F in use. The padding element 26 can also be added between the inner surface 62 of the outer shell 12 and the inner lining 22.

As shown in FIG. 4, two narrow bands 72 are secured to the upper portion of each of the side portions 58, 60. The narrow bands 72 are made of fabric, textile, soft PVC materials, synthetic leather or leather. In an alternative embodiment, a single continuous band that covers the upper portion of each of side portions 58, 60 and wraps around the rear of the ankle portion 56 can be used instead of two distinct bands 72.

Apertures 74 are then punched through the narrow bands 72, the outer shell 12 and the inner lining 22. Once punched, the apertures 74 are reinforced by metallic rivets (eyelets) 76 or any suitable means as is well known in the art of footwear construction.

The tongue 24 and toe cap 14 are then affixed to the outer shell 12. In a non-limiting embodiment, the toe cap 14 and the tongue 24 are pre-assembled prior to installation to outer shell 12. The tongue 24 is affixed to the toe cap 14 and extends upwardly and rearwardly from the toe cap 14 for covering the forefoot of the foot F. The frontal edge of tongue 24 can be sewn directly to toe cap 14 or can be fixed in an alternative manner known in the art. The toe cap 14 may be secured to the outer shell 12 by sewing both sides of toe cap 14 to each ends of the side portions 68, 70.

A last is afterwards inserted into the inside cavity of the outer shell 12 in order to complete the construction of the boot. The last enables the outer shell 12 to maintain its shape when the skirts 68, 70 are affixed to the insole 32. A light sanding of the skirt 68, 70 and the insole 32 60 may be performed to partially even the lower surface of the boot and provide a flat surface on which the outsole 32 can be mounted. The blade holder 16 is then mounted on the outsole 32.

The footbed 28 can be inserted into the outer shell 12 in order to sit upon the insole 30. The footbed 28 has an upper surface 78 for receiving the plantar surface PS of the foot F, and a padding wall 80 that projects upwardly from the upper surface for partially cupping the heel H and extending up to a medial line of the foot F.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A method of making a lasted skate boot for enclosing a human foot when in use, the foot having a heel, an Achilles tendon, an ankle with a medial malleolus and a lateral malleolus, a plantar surface, medial and lateral sides and toes, the method comprising:
   (a) providing a male-female mold having male and female sections for defining a mold cavity therebetween, the male section having sides, a rear portion and a bottom portion for defining a three dimensional shape corresponding to the external three dimensional shape of the foot, the female section defining a recess for receiving the male section, the male section comprising a plurality of inner channels for admitting liquid plastic material in the mold cavity;
   (b) providing a pre-cut sheet made of cloth material laminated to a support made of non-woven fabric;
   (c) placing the sheet on the male section of the mold such that the non-woven fabric contacts the sides and rear portion of the male section of the mold;
   (d) closing the male and female sections of the mold;
   (e) injecting liquid plastic material in the inner channels at a temperature of between 160° C. and 200° C. and at a pressure of between 985 psi and 1015 psi such that the liquid plastic material spreads on the sheet, pushes the sheet against the recess of the female section of the mold, fills the mold cavity and fuses with the non-woven fabric, the non-woven fabric having a thickness selected for creating a barrier in order to prevent the plastic material from reaching the cloth material such that, after cooling, an outer shell comprising a first layer made of non-woven fabric fused with injected plastic material and a second layer made of cloth material is made and wherein the outer shell has a heel portion for surrounding the heel, an ankle portion for surrounding the ankle, and medial and lateral side portions for enclosing the medial and lateral sides of the foot respectively;
   (f) opening the male and female sections of the mold; and
   (g) removing the outer shell from the mold.

2. A method as defined in claim 1, wherein the sheet further partially extends over the bottom portion of the male section such that the outer shell further comprises medial and lateral skirts after step (e).

3. A method as defined in claim 2, further comprising positioning an insole, a toe box and the outer shell over a last; and affixing the medial and lateral skirts to the insole.

4. A method as defined in claim 3, further comprising affixing a rigid outsole to a bottom portion of the insole.

5. A method as defined in claim 4, further comprising affixing an ice skate blade holder to a bottom surface of the rigid outsole.

6. A method as defined in claim 5, further comprising affixing a layer of material to an external surface of the outer shell.

7. A method as defined in claim 1, further comprising affixing an inner lining to an inner surface of the outer shell.

8. A method as defined in claim 7, further comprising placing a padding element between the inner lining and the inner surface of the outer shell.

9. A method as defined in claim 3, wherein the sheet further comprises an upper portion facing an upper part of the rear portion of the male section of the mold such that the outer shell further comprises a tendon guard for facing the Achilles tendon after step (e).

10. A method as defined in claim 1, wherein the liquid plastic material is selected from the group comprising surlyn, ethylene vinyl acetate, thermoplastic polyurethane, nylon66, hytrel, polypropylene and polyethylene.

11. A method as defined in claim 1, wherein the cloth material is selected from the group of polyester, nylon, carbon fibers, synthetic fibers and fiberglass.

12. A method as defined in claim 1, wherein the liquid plastic material is polypropylene.

13. A method as defined in claim 1, wherein the cloth material is made of polyester and the non-woven fabric has a thickness of least 0.8 mm.

* * * * *